(12) United States Patent
Di Sante et al.

(10) Patent No.: US 6,666,150 B2
(45) Date of Patent: Dec. 23, 2003

(54) REAR WINDOW SHELF FOR MOTOR VEHICLE INTEGRATED WITH SUPPORTS FOR OBJECTS

(75) Inventors: Giuseppe Di Sante, Roseto Degli Abruzzi (IT); Mario Biggio, Roseto Degli Abruzzi (IT); Patrizio D'Ambrosio, Roseto Degli Abruzzi (IT); Giovanni Bessone, Villanova Mondovi (IT)

(73) Assignee: Industrialesud S.p.A., Teramo (IT)

( * ) Notice: Subject to any disclaimer, the term of this patent is extended or adjusted under 35 U.S.C. 154(b) by 0 days.

(21) Appl. No.: 10/142,592

(22) Filed: May 10, 2002

(65) Prior Publication Data

US 2002/0170469 A1 Nov. 21, 2002

(30) Foreign Application Priority Data

May 17, 2001 (IT) ...................... MI2001A1030

(51) Int. Cl.[7] ............................... A47B 23/00
(52) U.S. Cl. ....................................... 108/44
(58) Field of Search ................ 108/44, 45; 296/26.08, 296/26.1; 224/494, 496, 499, 502

(56) References Cited

U.S. PATENT DOCUMENTS

| 4,962,709 | A | * | 10/1990 | Huber |
| 5,427,033 | A | * | 6/1995 | Bly |
| 5,634,408 | A | * | 6/1997 | Jarkowski |
| 5,878,672 | A | * | 3/1999 | Ostermann et al. |
| 6,050,202 | A | * | 4/2000 | Thompson |
| 6,092,708 | A | * | 7/2000 | Rand |
| 6,113,172 | A | * | 9/2000 | Chalout et al. |
| 6,176,535 | B1 | | 1/2001 | Chaloult et al. |
| 6,182,931 | B1 | * | 2/2001 | Richard |

FOREIGN PATENT DOCUMENTS

| DE | 85 15 210 U | | 11/1985 |
| DE | 298 19 322 U1 | | 4/1999 |
| DE | 100 07 137 A1 | | 8/2000 |
| DE | 199 53 479 A1 | | 5/2001 |
| EP | 203021 A1 | * | 5/1986 |
| GB | 2 196 907 A | | 5/1988 |

OTHER PUBLICATIONS

EP Search Report.

* cited by examiner

Primary Examiner—Jose V. Chen
(74) Attorney, Agent, or Firm—Hedman & Costigan, P.C.

(57) ABSTRACT

A rear window shelf (10) for motor vehicle integrated with supports for objects with end pins (11) to fit into seats made on the sides of the vehicle to be rotated, the rear window shelf (10) having an upper surface (12) exposed inside the vehicle and a lower surface (13) which becomes an inner upper wall of a boot compartment, in which the lower surface (13) of the rear window shelf (10) is provided with series of supports (17–19; 20–22; 23) which hold the various objects. The supports are elastic elements which can be hooked, nets with elastic perimetric ring or hooks for objects.

6 Claims, 2 Drawing Sheets

REAR WINDOW SHELF FOR MOTOR VEHICLE INTEGRATED WITH SUPPORTS FOR OBJECTS

The present application claims priority to Italian Patent Application Serial No. MI 2000A 001030, filed May 17, 2001.

BACKGROUND OF THE INVENTION

The present invention relates to a rear window shelf for motor vehicle integrated with supports for objects.

In the automobile industry every attempt is made to optimize the function of each part or element with which the vehicle is equipped to improve the ergonomics of the vehicle and decrease its manufacturing costs, eliminating where possible all superfluous assemblies.

Therefore, in the first place it is necessary to provide simple and functional elements that are easy to fit on the assembly line and which, as far as possible, eliminate all idle times or delays in the fitting out of the vehicle.

Moreover, all additional elements must not reduce the spaces available both inside the vehicle in the passenger compartment and in the compartment for storing luggage or other objects transported by the vehicle.

Furthermore, it must be taken into account that the single simple or compound elements are manufactured in phases prior to the assembly phase and are sent to the assembly line in containers.

In this case also every attempt must be made to minimize the spaces occupied in order to limit the packaging containers.

As an example, the vehicle is provided with "rear window shelves" that cover the boot compartment and which can carry objects on top of it.

Currently, when the boot door of the vehicle is opened, the objects that are placed on these shelves fall into the boot compartment or onto the rear seat of the vehicle.

All this causes problems of inconvenience to collect the fallen objects, and a certain amount of instability of these objects when the vehicle is moving, especially on bends.

SUMMARY OF THE INVENTION

The object of the present invention is therefore to identify an optimal solution to the technical problem set forth above.

Another object is to produce a rear window shelf suitable to accomplish the purpose mentioned above which is particularly simple to use and to manufacture.

Yet another object is to produce a rear window shelf that permits efficacious storage in considerably small spaces to be sent to the assembly line and simply stored as spare part.

These objects according to the present invention are attained by producing a rear window shelf for a motor vehicle integrated with supports for objects having end pins (11) that fit into seats on each side of said vehicle, said pins (11) being sized to allow said rear window shelf (10) to be rotated, said rear window shelf (10) having an upper surface (12) exposed inside said vehicle and a lower surface (13) which becomes an inner upper wall of a trunk compartment, wherein said lower surface (13) is provided with a series of supports (17–19; 20–22; 23) which hold said objects, wherein a first support comprises a block (17) holding an elastic ring element (18) having a free end connected to a hook element (19) that hooks into said elastic ring (18).

BRIEF DESCRIPTION OF THE DRAWINGS

The characteristics and advantages of a rear window shelf for motor vehicle integrated with supports for objects according to the present invention shall become clearer and more apparent from the following description, provided purely as a non-limiting example of embodiment with reference to the accompanying figures, in which.

DETAILED DESCRIPTION OF THE INVENTION

Figure 1:
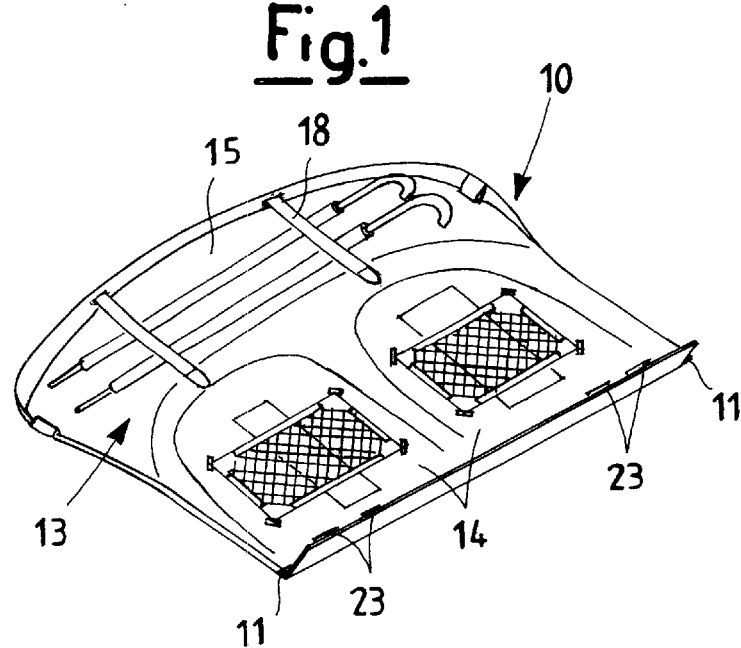
FIG. 1 is a perspective view of a general solution of a lower portion of a rear window shelf for motor vehicle integrated with a series of supports for objects according to the present invention.
Figure 4:
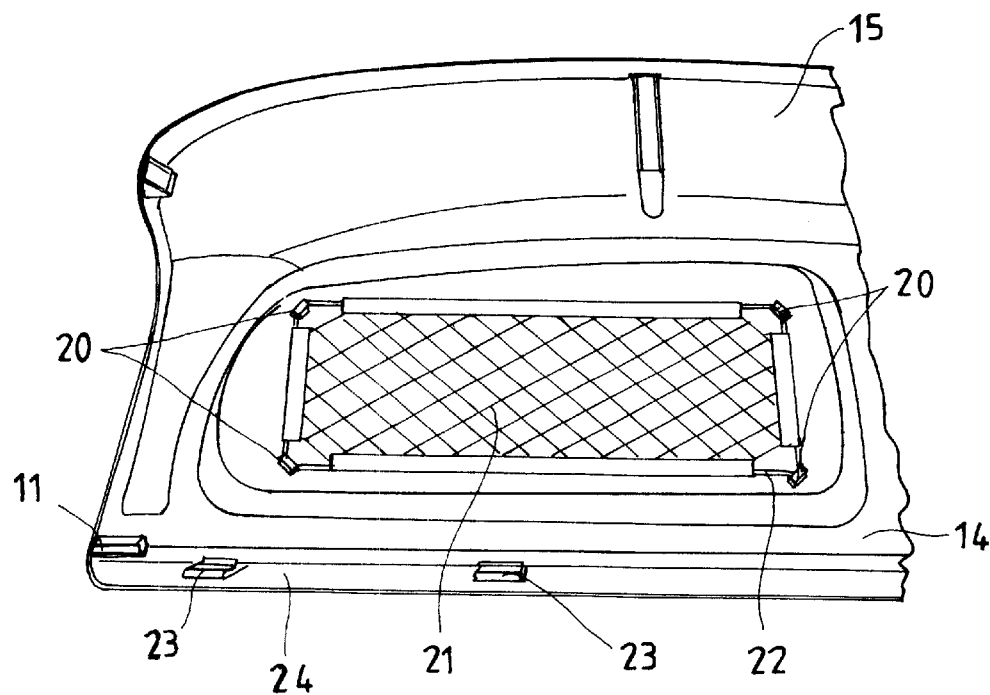
FIG. 4 is an enlarged perspective view of a detail of the rear window shelf in FIG. 1.

With general reference to the various figures, these show in an entirely schematic manner a rear window shelf for motor vehicle integrated with supports for objects according to the present invention, indicated as a whole with 10.

A rear window shelf for motor vehicle 10 like this is arranged to be rotated around end pins 11 fitted into seats (not shown) made on the sides of the vehicle, generally to cover the boot compartment.

This rear window shelf element 10 has an upper surface 12 which is exposed inside the vehicle and a lower surface 13 which becomes the upper inner wall of the boot compartment.

The rear window shelf 10 has, in the area provided with end pins 11, one or more concave portions 14 and in the free area that rotates an essentially flat portion 15.

According to the present invention the lower surface 13 is provided with a series of supports which hold various objects and which occupy an extremely small space.

In fact, the flat portion 15, in line with curved stiffening mouldings 16, is provided with first supports of the elastic type 17, 18 and 19.

These first supports comprise a block 17 that holds an elastic ring element 18, the free end of which, provided with a handling tab 18a, engages with a hook element 19 to hook the elastic ring 18. In the example two of these first supports are provided, which may for example constrain an umbrella or other stick shaped objects, with a section of up to 40–50 cm in diameter.

Figure 2:
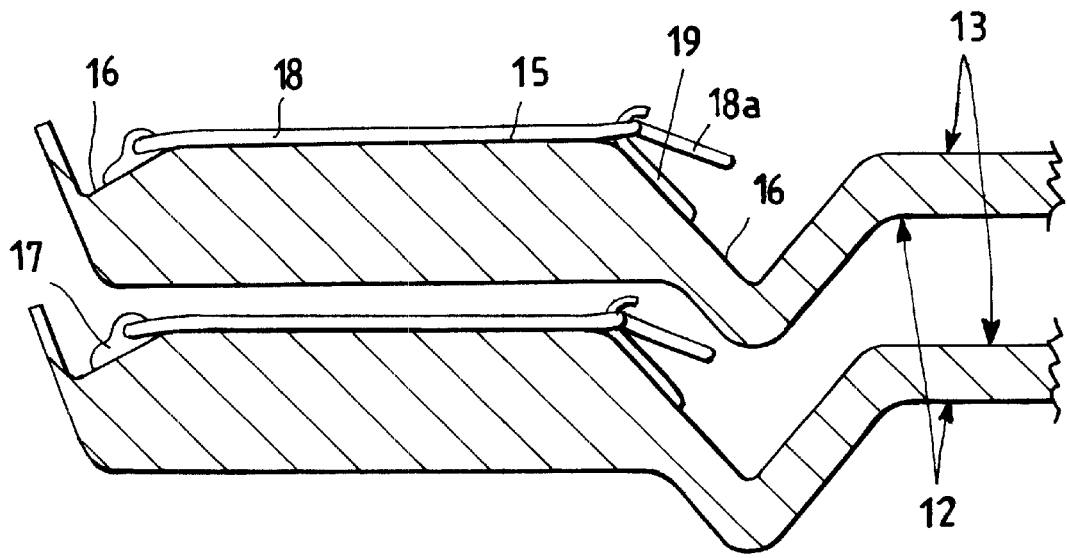
FIG. 2 is a sectional view of enlarged details of two rear window shelves according to the invention stacked on top of each other.
Figure 3:
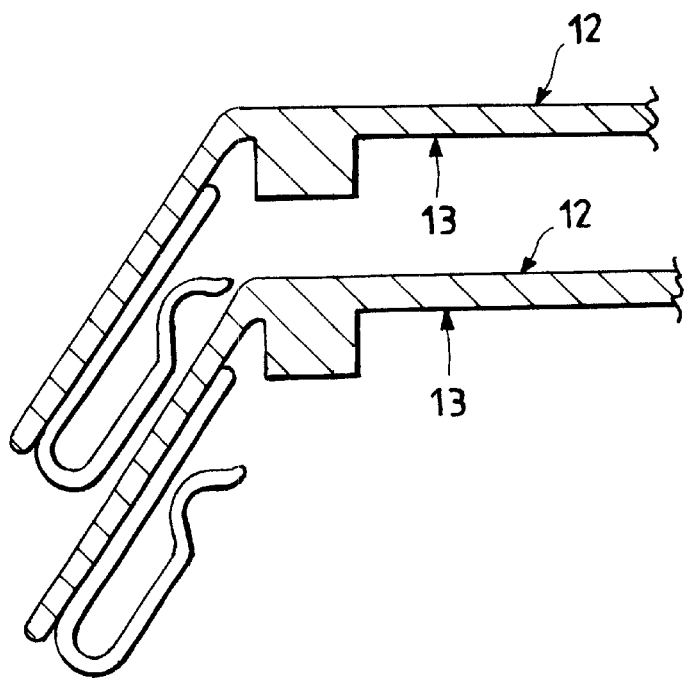
FIG. 3 is a sectional view of further enlarged details of two rear window shelves according to the invention stacked on top of each other.

The elastic ring 18 is thus secured solidly to the rear window shelf 10 by the block 17 and hooked to the hook element 19. In this manner first supports with a minimum overall dimensions are produced incorporated in the interspace between two rear window shelves 10, as shown in FIG. 2, positioned in a collection container.

The rear window shelf 10 of the present invention integrated with supports for objects also has second supports indicated with 20, 21, 22 positioned in the area of the end pins 11 which is provided in the example with two concave portions 14.

These second supports 20, 21, 22 comprise four hooks 20, positioned integrally and inside the concave portions 14 at the four corners of a quadrilateral, and a net 21. The net 21 has a perimetric elastic 22 that in secured to the four hooks 20 to make a pocket open on its four sides ready to receive objects of no great thickness.

Also in this case the second supports 20, 21, 22 have overall dimensions that can be incorporated in the interspaces between two rear window shelves of the present invention, when they are positioned on top of each other inside a collection container.

Lastly, the rear window shelf 10 of the invention is integrated with third supports indicated with 23 and positioned in a curved end portion 24 in the area with the end pins 11.

These third supports comprise flat hooks 23 secured to the curved portion 24 on which objects, such as bags, can be hung. These supports, just as the previous ones, steadily hold the objects placed or hooked on them, even when the rear window shelf is rotated.

It has thus been shown that a rear window shelf for motor vehicle integrated with supports for objects according to the present invention attains the objects set forth above.

The rear window shelf for motor vehicle integrated with supports for objects has a particularly simply structure and can be stacked with other rear window shelves in considerably small spaces.

The rear window shelf for motor vehicle integrated with supports for objects of the present invention thus conceived may be subject to numerous modifications and variants, without however departing from the scope of the invention.

Moreover, in practice the materials used, their dimensions and components may be any according to technical requirements.

What is claimed is:

1. A rear window shelf (10) for a motor vehicle integrated with supports for objects, said rear window shelf (10) having end pins (11) that fit into seats on each side of said vehicle, said pins (11) being sized to allow said rear window shelf (10) to be rotated, said rear window shelf (10) having an upper surface (12) exposed inside said vehicle and a lower surface (13) which becomes an inner upper wall of a trunk compartment, wherein said lower surface (13) is provided with a series of supports (17–19; 20–22; 23) which hold said objects, wherein a first support comprises a block (17) holding an elastic ring element (18) having a free end connected to a hook element (19) that hooks into said elastic ring (18).

2. The rear window shelf (10) for a motor vehicle according to claim 1, wherein said elastic ring element (18) at one free end is provided with a handling tab (18*a*).

3. The rear window shelf (10) for a motor vehicle according to claim 1, wherein said first support (17, 18, 19) is arranged in a flat portion (15) of said lower surface (13), in line with curved stiffening mouldings (16).

4. The rear window shelf (10) for a motor vehicle integrated with supports for objects, said rear window shelf (10) having end pins (11) that fit into seats on each side of said vehicle, said pins (11) being sized to allow said rear window shelf (10) to be rotated, said rear window shelf (10) having an upper surface (12) exposed inside said vehicle and a lower surface (13) which becomes an inner upper wall of a trunk compartment, wherein said lower surface (13) is provided with a series of supports (17–19; 20–22; 23) which hold said objects, wherein a second support comprises four hooks (20), positioned in line with four corners of a quadrilateral, a net (21), said net (21) having an elastic member (22) permanently disposed on said net (21) to secure said four hooks (20) making a pocket open on four sides of said net, wherein a second support (20, 21, 22) is arranged inside concave portions (14) of said lower surface (13).

5. The rear window shelf (10) for a motor vehicle according to claim 1, wherein a third support comprises hooks (23) secured to a curved portion (24) made in line with one end of said rear window shelf (10) provided with end pins (11).

6. The rear window shelf (10) for a motor vehicle according to claim 1, further comprising a second support comprising four hooks (20), positioned in line with four corners of a quadrilateral, a net (21), said net (21) having an elastic member (22) permanently disposed on said net (21) to secure said four hooks (20) making a pocket open on four sides of said net, wherein a second support (20, 21, 22) is arranged inside concave portions (14) of said lower surface (13) and a third support comprising hooks (23) secured to a curved portion (24) made in line with one end of said rear window shelf (10) provided with end pins (11).

\* \* \* \* \*